United States Patent
Fenton

(10) Patent No.: US 9,884,661 B2
(45) Date of Patent: Feb. 6, 2018

(54) COMPOSITE PANEL EDGE TREATMENTS AND JOINTS AND CARGO BODY HAVING SAME

(71) Applicant: STI Holdings, Inc., Stoughton, WI (US)

(72) Inventor: Gary L. Fenton, Edgerton, WI (US)

(73) Assignee: STI Holdings, Inc., Stoughton, WI (US)

( * ) Notice: Subject to any disclaimer, the term of this patent is extended or adjusted under 35 U.S.C. 154(b) by 0 days.

(21) Appl. No.: 15/353,475

(22) Filed: Nov. 16, 2016

(65) Prior Publication Data

US 2017/0057562 A1  Mar. 2, 2017

Related U.S. Application Data

(62) Division of application No. 14/730,729, filed on Jun. 4, 2015.

(60) Provisional application No. 62/007,807, filed on Jun. 4, 2014.

(51) Int. Cl.
| | |
|---|---|
| *B62D 33/04* | (2006.01) |
| *B62D 25/02* | (2006.01) |
| *B62D 63/06* | (2006.01) |
| *B62D 25/20* | (2006.01) |

(52) U.S. Cl.
CPC .......... *B62D 33/046* (2013.01); *B62D 25/02* (2013.01); *B62D 25/2054* (2013.01); *B62D 63/06* (2013.01)

(58) Field of Classification Search
CPC .. B62D 33/046; B62D 25/2054; B62D 25/02; B62D 63/06
See application file for complete search history.

(56) References Cited

U.S. PATENT DOCUMENTS

| | | | |
|---|---|---|---|
| 5,934,742 A | 8/1999 | Fenton et al. | |
| 6,450,564 B1 | 9/2002 | Sill | |
| 6,527,335 B1 * | 3/2003 | Yurgevich | B62D 33/04 296/186.1 |
| 6,578,902 B2 | 6/2003 | Sill | |

(Continued)

OTHER PUBLICATIONS

Whiting airCell Panels product brochure, Jun. 2014 ( 6 pages) (Year: 2014).*

(Continued)

*Primary Examiner* — Pinel E Romain
(74) *Attorney, Agent, or Firm* — Michael Best & Friedrich LLP

(57) ABSTRACT

A cargo body includes sidewalls constructed of pairs of panels secured together at respective joints. Each of the plurality of panels is a composite panel having a core, an interior skin secured to a first side of the core facing the cargo receiving volume, and an exterior skin secured to a second opposite side. Each joint includes an interior splice plate and an exterior splice plate, and co-facing edge portions of the adjacent pair of panels are sandwiched between the interior and exterior splice places. Each edge portion defines a region of reduced core thickness in which a core thickness measured between the respective interior and exterior skins is less than a maximum core thickness. A recess is formed by the pair of interior or exterior skins to receive the corresponding splice plate, such that the corresponding one of the interior and exterior splice plate is nested into the recess.

10 Claims, 15 Drawing Sheets

(56) References Cited

U.S. PATENT DOCUMENTS

| | | |
|---|---|---|
| 6,607,237 B1 | 8/2003 | Graaff et al. |
| 7,500,713 B2 | 3/2009 | Riley et al. |
| 8,016,152 B2 | 9/2011 | Roush et al. |
| 8,419,110 B2 | 4/2013 | Katz et al. |
| 2008/0292898 A1 | 11/2008 | Straza |
| 2009/0053548 A1 | 2/2009 | Straza |
| 2013/0224419 A1 | 8/2013 | Lee et al. |
| 2013/0330521 A1 | 12/2013 | Ebnoether |
| 2015/0044494 A1 | 2/2015 | Ebnoether |

OTHER PUBLICATIONS

TruckingInfo.com, "Trailer Update," downloaded from http://www.truckinginfo.com/article/story/2013/07/trailer-update.aspx, available Jul. 2013, (10 pages).

trailer-bodybuilders.com, "Mid-America Trucking Show coverage: Newest trailer designs exhibited at MATS," downloaded from http://trailer-bodybuilders.com/trailers/mid-america-trucking-show-coverage-newest-trailer-, May 1, 2013 (5 pages).

Transport Topics, "Whiting Door Licenses Technology to Make Lightweight Steel Panels," downloaded from http://www.ttnews.com/articles/printopt.aspx?storyid=34581, Mar. 31, 2014 (2 pages).

Office Action from the United States Patent and Trademark Office for U.S. Appl. No. 14/730,729 dated Mar. 9, 2017 (10 pages).

\* cited by examiner

COMPOSITE PANEL EDGE TREATMENTS AND JOINTS AND CARGO BODY HAVING SAME

CROSS-REFERENCE TO RELATED APPLICATIONS

This application is a divisional of U.S. patent application Ser. No. 14/730,729, filed Jun. 4, 2015, which claims priority to U.S. Provisional Patent Application 62/007,807, filed Jun. 4, 2014, the entire contents of both of which are incorporated by reference herein.

BACKGROUND

The invention relates to cargo body construction, for example, for over-the-road trailers pulled by semi tractors. In particular, the invention relates to trailer sidewall panels and joints for such sidewall panels, in addition to trailer walls, floors, and roofs.

In so-called "sheet and post" construction, thin sheets are joined with structural posts such that the thin sheets define a majority of the surface area that encloses the cargo volume while the posts are relied upon for the required strength and rigidity of the wall. In such construction, joint locations typically each present a locally increased wall thickness where the post protrudes to a significant extent beyond the sheets. So-called "plate wall" construction alleviates this drawback to at least some degree by utilizing substantially thicker, load bearing wall panels with splice plates to secure the edges of adjacent panels. Although modern plate wall construction has extended to the use of composite panels including sheet metal skins and low density filler materials, there remains a need in the field for further advancement in the joint structures between wall panels for constructing cargo bodies that are lightweight, efficient to manufacture and assemble, and cost effective.

SUMMARY

In some embodiments, the invention provides a cargo body including a floor, a roof and a plurality of sidewalls extending between the floor and the roof to define a cargo receiving volume in cooperation with the floor and the roof, wherein each one of the plurality of sidewalls is constructed of a plurality of panels including adjacent pairs of panels secured together at respective joints, and wherein each of the plurality of panels is an assembled panel having a core, an interior skin secured to a first side of the core facing the cargo receiving volume, and an exterior skin secured to a second side of the core opposite the first side. Each of the joints is formed to include overlapping edge portions of a first one of the adjacent pair of panels and a second one of the adjacent pair of panels. Each of the overlapping edge portions has a thickness less than 20 percent of a total panel thickness of the corresponding one of the adjacent pair of panels such that the joint formed thereby defines a recess between co-facing edge portions of the first and second ones of the adjacent pair of panels. A profile insert defining a longitudinal channel is positioned in the recess defined by the overlapping edge portions at each joint. Each joint is secured by fixedly attaching the profile insert to the overlapping edge portions.

In some embodiments, the invention provides a cargo body including a floor, a roof and a plurality of sidewalls extending between the floor and the roof to define a cargo receiving volume in cooperation with the floor and the roof, wherein each one of the plurality of sidewalls is constructed of a plurality of panels including adjacent pairs of panels secured together at respective joints, and wherein each of the plurality of panels is an assembled panel having a core, an interior skin secured to a first side of the core facing the cargo receiving volume, and an exterior skin secured to a second side of the core opposite the first side. Each of the joints is formed as a lap joint in which an edge portion of a first one of the adjacent pair of panels overlaps a portion of a second one of the adjacent pair of panels, and an edge portion of the second one of the adjacent pair of panels overlaps a portion of the first one of the adjacent pair of panels. The first one of the adjacent pair of panels has a reduced-thickness core portion throughout the edge portion in which a core thickness measured between the interior and exterior skins is less than half of a maximum core thickness of the first one of the adjacent pair of panels. The second one of the adjacent pair of panels has a reduced-thickness core portion throughout the edge portion in which a core thickness measured between the interior and exterior skins is less than a maximum core thickness of the second one of the adjacent pair of panels.

Some embodiments of the present invention provide a cargo body including a floor, a roof, and a plurality of sidewalls extending between the floor and the roof to define a cargo receiving volume in cooperation with the floor and the roof, wherein each one of the plurality of sidewalls is constructed of a plurality of panels including adjacent pairs of panels secured together at respective joints, and wherein each of the plurality of panels is a composite panel having a core, an interior skin secured to a first side of the core facing the cargo receiving volume, and an exterior skin secured to a second side of the core opposite the first side. Each of the joints includes an interior splice plate and an exterior splice plate, and co-facing edge portions of the adjacent pair of panels are sandwiched between the interior and exterior splice places. Each edge portion defines a region of reduced core thickness in which a core thickness measured between the respective interior and exterior skins is less than a maximum core thickness measured between the respective interior and exterior skins. A recess is formed by the pair of interior skins or by the pair of exterior skins to receive the corresponding one of the interior and exterior splice plates, such that the corresponding one of the interior and exterior splice plate is nested into the recess.

DETAILED DESCRIPTION

Figure 1:
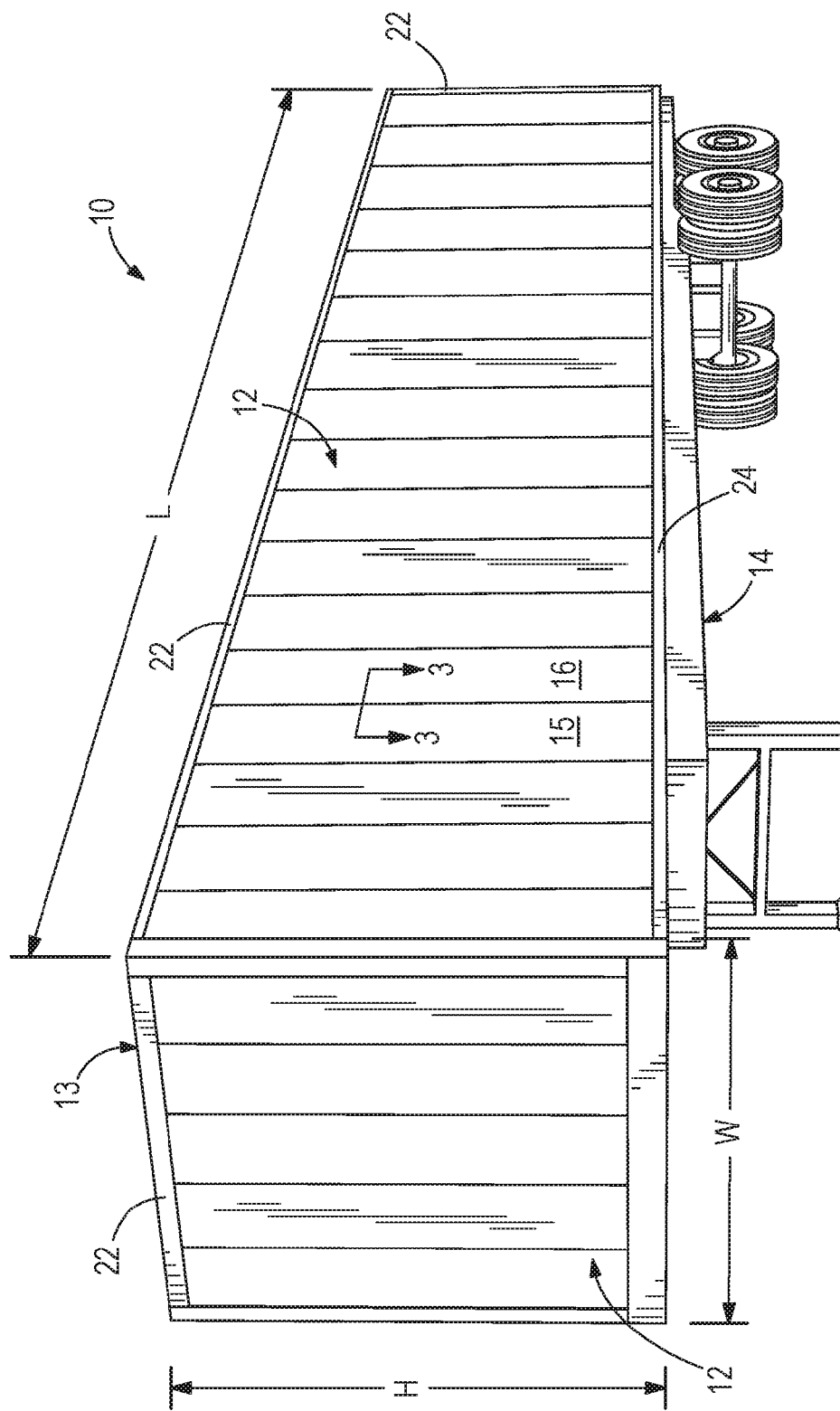
FIG. 1 is a perspective view of a trailer, including a plurality of sidewalls having sidewall joints, according to one embodiment of the present invention.
Figure 2:
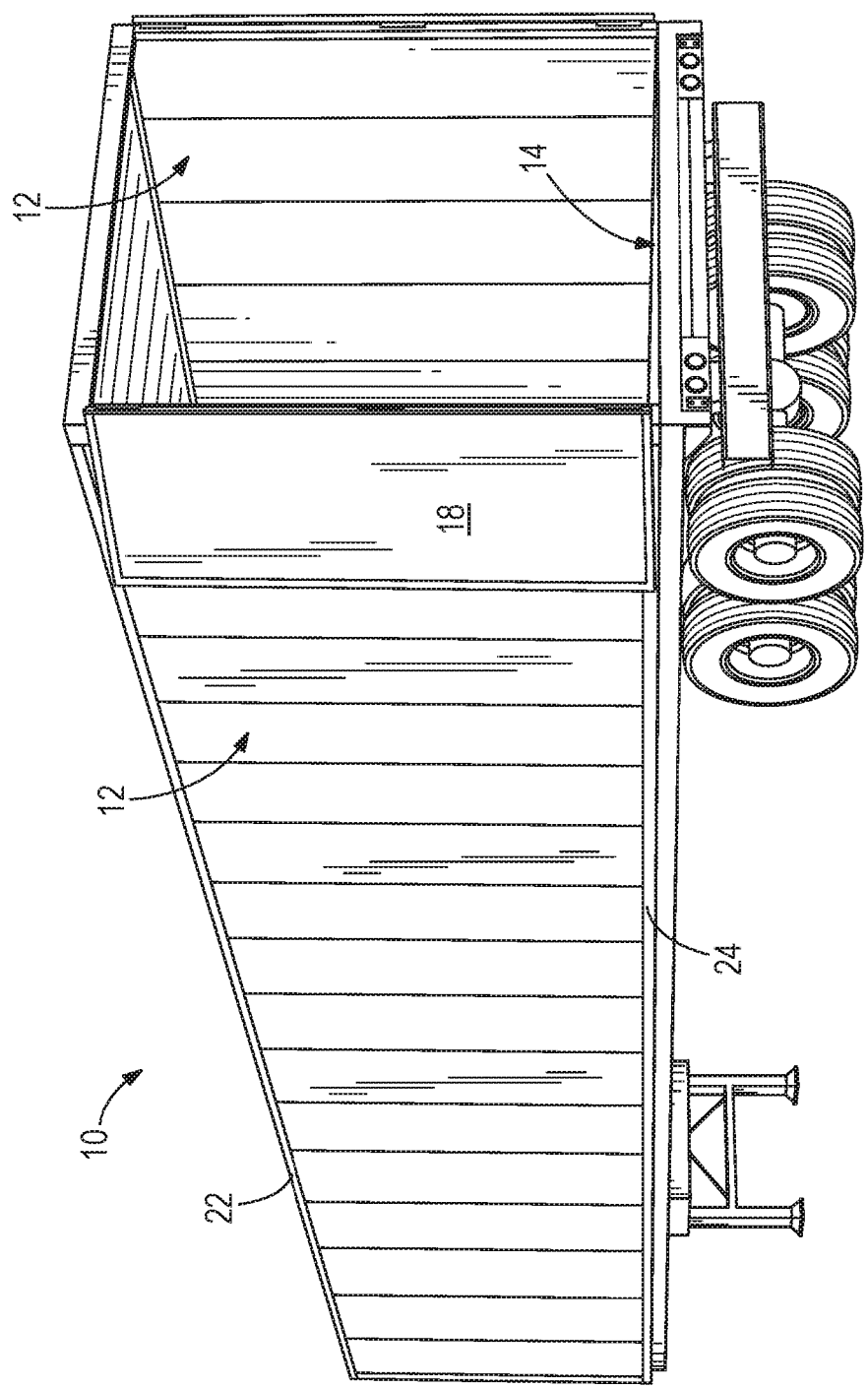
FIG. 2 is an alternate perspective view of the trailer of FIG. 1.

FIGS. 1 and 2 illustrate a cargo body configured as a trailer 10 for over-the-road use with a truck to transport large cargo volumes. As shown, the trailer 10 is a semi-trailer configured for use with a road tractor (i.e., in forming a so-called 18-wheeler). Aspects of the invention are not necessarily limited to such a trailer, and other trailer and cargo body configurations are understood as optional. The trailer 10 includes a chassis having axles with multiple sets of wheels, although similar cargo bodies may be provided with alternate rolling chassis constructions or none at all. The trailer 10 defines a length L in a longitudinal or transport direction. The length L can be 53 feet in some constructions, although the trailer can be manufactured to other lengths greater than or less than 53 feet. Perpendicular to the longitudinal direction, the trailer 10 defines a width W and a height H. The width W cooperates with the length L to define a plan view footprint of the trailer 10, while the height H is measured perpendicular to the footprint (i.e., perpendicular to the ground). Subtracting for wall thicknesses, the length L, the width W, and the height H cooperate to define a cargo receiving interior volume of the trailer 10. The trailer 10 includes a plurality of sidewalls 12, including two primary lengthwise sidewalls 12 and a sidewall 12 facing the leading direction and spanning between the two primary lengthwise sidewalls 12. All of the sidewalls 12 extend between a roof 13 of the trailer 10 and a floor 14 of the trailer 10. As discussed in further detail below, the sidewalls 12 can be constructed of pairs of panels 15, 16 joined together by joints extending parallel to the direction of the trailer height H between the roof 13 and the floor 14. Top rails 22 and bottom rails 24 are provided to flank and secure the upper and lower edges of each of the sidewall panels 15, 16. At the rear of the trailer 10 as shown in FIG. 2, at least one door panel 18 is provided to selectively open for accessing the interior cargo volume for loading and unloading.

Figure 3:
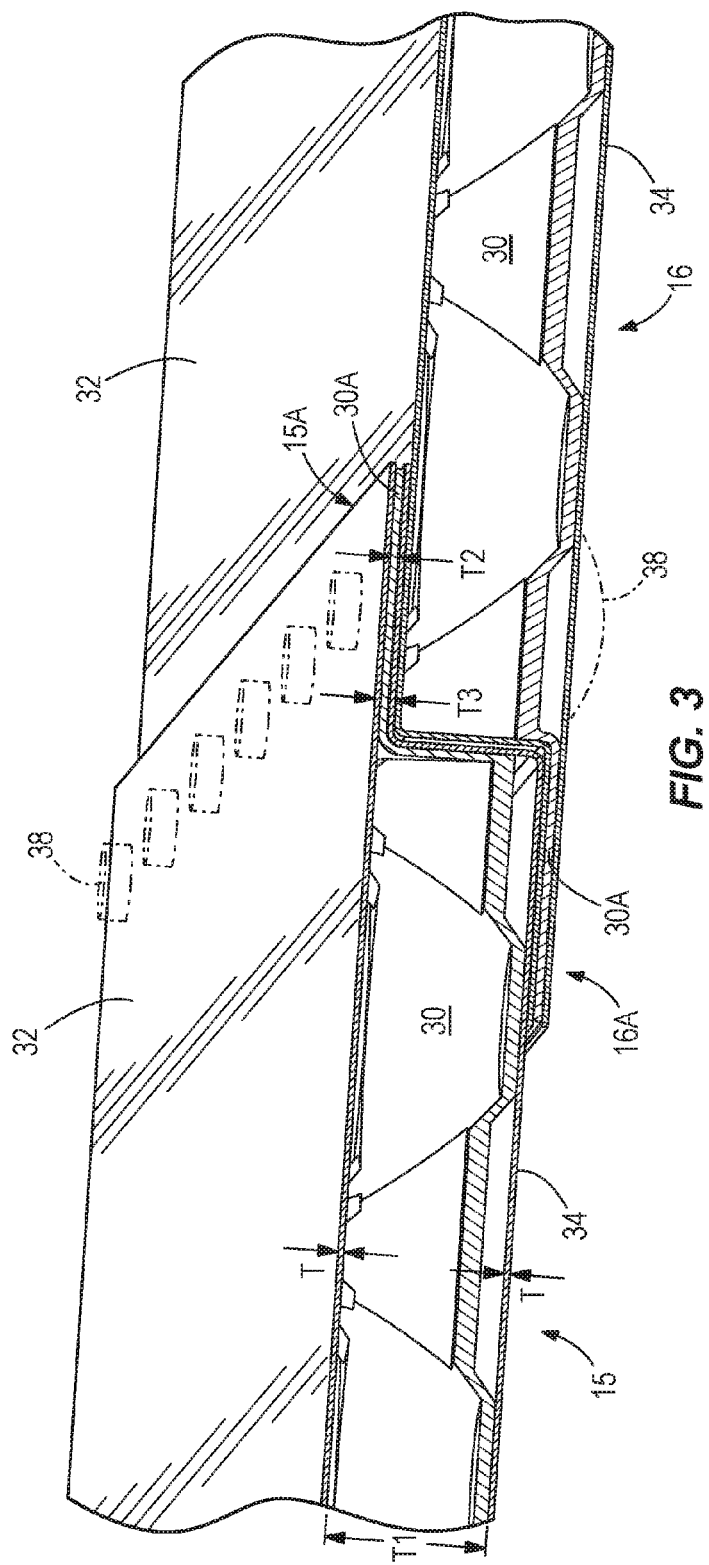
FIG. 3 is a cross-sectional view of one of the sidewall joints of the trailer shown in FIGS. 1 and 2, taken along line 3-3 of FIG. 1.

A first panel edge treatment and a configuration for joining adjacent sidewall panels 15, 16 are shown in FIG. 3. Although a single joint is shown, it is understood that this structure may be repeated throughout the trailer 10 at each location where two sidewall panels are joined. In the illustrated construction, the sidewall panels 15, 16 are positioned laterally side-by-side such that the joint therebetween extends in the direction of the trailer height H, but other orientations may be provided in alternate constructions. The joint of FIG. 3 consists of a shiplap joint in which a multi-layer flange or edge portion 15A of the first panel 15 overlaps a main portion of the second panel 16, and a multi-layer flange or edge portion 16A of the second panel 16 overlaps a main portion of the first panel 15. This results in the construction of a Z-shaped joint interface as shown in FIG. 3, including two 90-degree corners.

Each of the panels 15, 16 can have a composite construction including a core sheet, or simply, core 30, and respective interior and exterior skins 32, 34. The interior skin 32 is secured to a first side of the core 30 facing the cargo receiving volume of the trailer 10, and the exterior skin 34 is secured to a second side of the core 30 opposite the first side and facing the exterior of the trailer 10. Each of the interior and exterior skins 32, 34 can have a thickness T perpendicular to sheet plane that is not less than 0.008 inch and not more than 0.080 inch in some constructions, and more particularly not more than 0.050 inch (e.g., 0.016 inch). The interior and exterior skins 32, 34 can be galvanized steel sheets, or aluminum, among other materials.

The core 30 of each of the panels 15, 16 can define a thickness T1 (e.g., maximum thickness) that is present throughout the main portion of the panel 15, 16, but not in the respective edge portions 15A, 16A. In some constructions, the core thickness T1 can be 0.100 inch or greater, more particularly 0.250 inch or greater, up to 1.5 inches, or more. For example, the core thickness T1 can be 0.500 inch. Although the core 30 of each panel 15, 16 extends into the respective edge portions 15A, 16A, each core 30 defines a reduced-thickness portion 30A, throughout the regions defined by the edge portions 15A, 16A, the portion 30A having a thickness T2 significantly less than the maximum core thickness T1 (e.g., reduced core thickness T2 is less than half of maximum core thickness T1). The thickness T2 of the core portion 30A is not less than 0.008 inch and not more than 0.016 inch, in some constructions, and more particularly, may be about 0.011 inch (0.010 inch to 0.012 inch) in some constructions. A total thickness T3 of each of the edge portions 15A, 16A can be 0.100 inch or less, or further 0.060 inch or less. In some constructions, the thickness T3 of each of the edge portions 15A, 16A is less than 0.050 inch (e.g., 0.043 inch steel or 0.176 inch aluminum). The core thicknesses T1, T2 are measured between the interior and exterior skins 32, 34, perpendicular to the principal parallel planar directions of the interior and exterior skins 32, 34. The thicknesses T3 of the edge portions 15A, 16A are taken in this direction as well.

The cores 30 of the panels 15, 16 can be profiled sheets of metal (e.g., carbon steel, mild steel, stainless steel, galvanized steel, or other materials such as aluminum). Each core 30 can be constructed by profiling (e.g., embossing) a flat starting sheet such that the final core thickness T1 is thicker than the material thickness of the starting sheet. For example, each core 30 can be constructed by profiling a flat starting sheet such that the final core thickness T1 is more than 10 times the material thickness of the starting sheet, and in some cases is more than 20 times, and even more than 50 times the material thickness of the starting sheet. The thickness T2 of the core portion 30A in the edge portions 15A, 16A may be equivalent to the starting sheet thickness. Each core 30 can be a metal sheet of undulating form (e.g., repeating waves of any type and shape in both length and width directions of the sheet, such as an anticlastic form) having an array of interspersed peaks and valleys, such as uniformly-interspersed peaks and valleys. In some embodiments, the cores 30 can be formed by dual embossing, which is to say embossed in two directions from the plane defined by the starting sheet. The cores 30 may be an adapted form of structures described in U.S. Patent Application Publication No. 2013/0244006, U.S. Patent Application Publication No. 2007/0243408, U.S. Patent Application Publication No. 2007/0114269, U.S. Patent Application Publication No. 2009/0123709, U.S. Pat. No. 8,835,016, or U.S. Pat. No. 7,757,931, assigned to Celltech Metals, Inc., the entire contents of all of which are incorporated by reference herein. However, it should be noted that certain aspects of the invention are not limited to the exact core constructions disclosed in the incorporated documents, or even their general type. For example, the cores 30 of one or more panels 15, 16 can be constructed of non-metallic materials such as wood, plastic (e.g., extruded polyethylene (PE), PE-based foam, blow molded, thermoset, etc.), composite materials, paper, foam, ceramic, and the like. Some such materials may be formed in a shape similar to the illustrated cores 30, or in alternate forms, including flat or plate-like, honeycomb structure, and others. Regardless of the core construction, other features of the panels and joints may conform to the illustrations and description herein.

Returning now to the interface between the two panels 15, 16 at the joint of FIG. 3, each of the edge portions 15A, 16A is made up of multiple layers—in the illustrated construction, three layers. With respect to the edge portion 15A of the first panel 15, the layers include the continuation of the interior skin 32, which extends in plane with the portion of the interior skin 32 covering the majority of the panel 15, a portion of the exterior skin 34, which is separated from the majority portion of the exterior skin 34 by two 90-degree bends to lie adjacent the interior side of the interior skin 32 of the second panel 16, and the core portion 30A positioned therebetween. As shown, the core portion 30A is flat (i.e., planar, or unprofiled). The edge portion 16A of the second panel 16 has substantially the same construction as that of the edge portion 15A of the first panel 15, except that the configuration of the interior and exterior skins 32, 34 is reversed. That is, the exterior skin 34 extends beyond the full-thickness portion of the core 30, onto the full-thickness portion of the core of the first panel 15, and the interior skin 32 is formed with two 90-degree bends such that a portion of the interior skin 32 of the second panel 16 lies adjacent the exterior skin 34 of the first panel 15. Although the joint is shown to include multiple 90-degree bends, each of the panels 15, 16 may include corners of greater than 90 degrees for assembly purposes, and can be formed by bending the corresponding ones of the skins 32, 34 less than 90 degrees to form an interior angle greater than 90 degrees (see interior skin 1032 of FIG. 16). The joining of the first and second panels 15, 16 can be via one, two, or more rows of mechanical fasteners 38 (e.g., screws, rivets, etc.), welding, adhesive bonding, or a combination of methods. An exemplary arrangement for joining by a single row of rivets 38 is shown in phantom lines in FIG. 3. The rivets 38 may also be installed from the opposite side, in mirrored orientation from that shown.

FIG. 3 also shows each edge portion 15A, 16A laid upon the surface of the adjoining panel 15, 16. A configuration that allows for part or all of the thickness T3 of the edge portions 15A, 16A to be recessed into the surface of the adjoining panel 15, 16 is also contemplated. If fully recessed, an entirely smooth transition is provided along the inner and/or outer surfaces of the two mating panels 15, 16 with the edge portions 15A, 16A made flush with the respective inner and outer surfaces of the interior and exterior 32, 34 skins of the adjoining panel 15, 16. Even in the construction shown, where the full thickness T3 of each edge portion 15A, 16A is raised beyond the respective inner and outer surfaces of the interior and exterior 32, 34 skins of the adjoining panel 15, 16, the transition or "lip" at this interface may provide a smooth joint transition, unlikely to impede or snag cargo on the interior and providing a smooth exterior trailer surface. For example, conventional joint constructions will introduce protruding joint hardware that extends perpendicular from the panel surface by a distance of ⅝ inch to 1.0 inch, whereas the edge portion thickness T3 as disclosed herein may be 0.100 inch or less, characterized herein as smooth. Alternatively, the edge can be offset in order to create a planar surface across the joint, i.e., faces of the skins 32, 34 of each panel 15, 16 planar to the other adjacent panel 15, 16.

Figure 4:
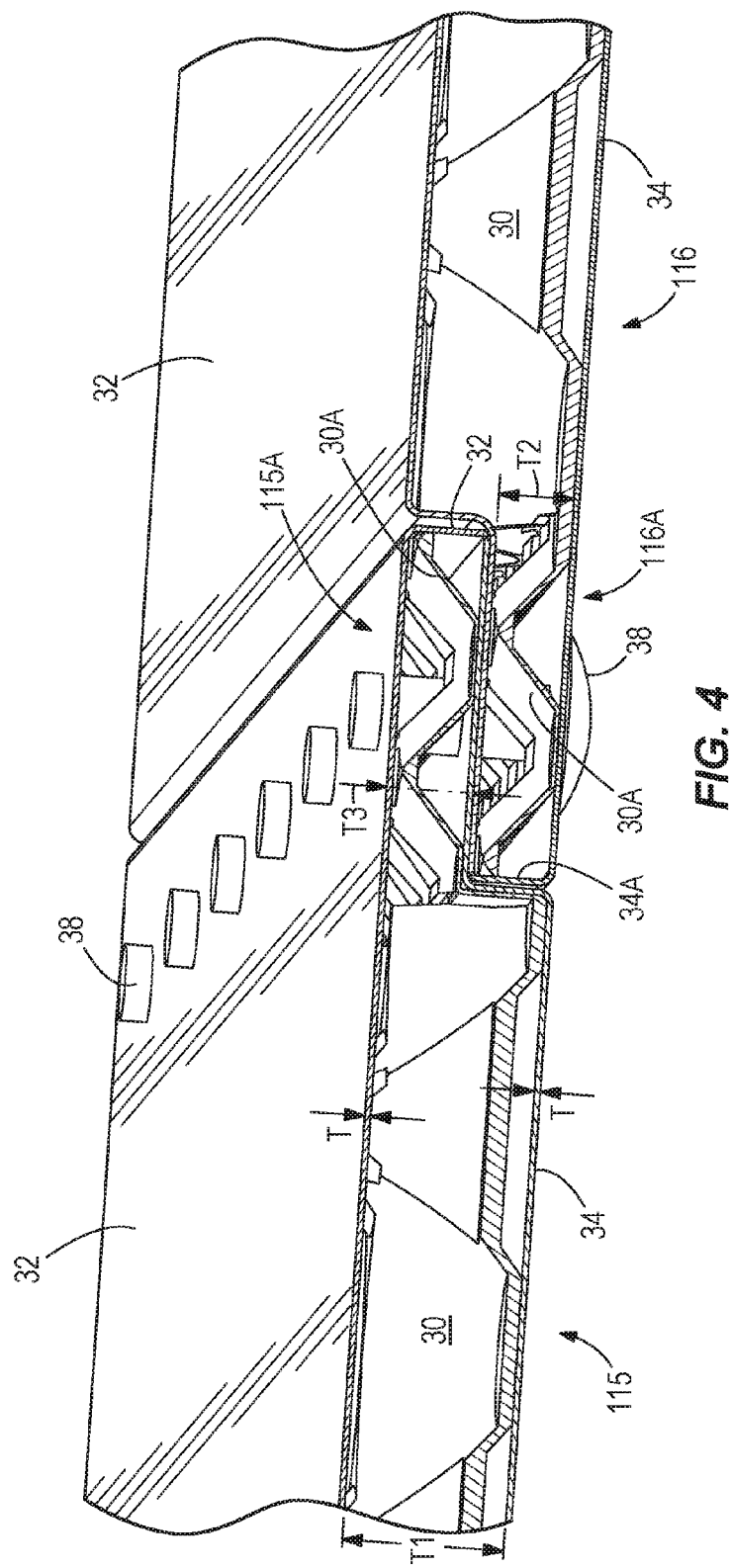
FIG. 4 is a cross-sectional view of a sidewall joint of the trailer shown in FIGS. 1 and 2, according to a second embodiment.

A panel edge treatment and a corresponding joint construction according to a second embodiment are shown in FIG. 4. A shiplap joint is formed, similar to that shown and described above in reference to FIG. 3, except as noted below. Therefore, the above description is relied upon for disclosing all features not repeated directly in reference to FIG. 4 to avoid redundancy. Each panel 115, 116 is formed to include a flange or edge portion 115A, 116A extending from a main portion of the panel 115, 116. As with the joint of FIG. 3, the core 30 of each panel 115, 116 defines a maximum thickness T1 throughout the main portion, but not within the edge portions 115A, 116A, which instead include reduced-thickness core portions 30A having thickness T2. Rather than a flat core portion as in FIG. 3, the reduced-thickness core portions 30A of FIG. 4 can be profiled in any manner, including in a manner similar to the main portions of the core 30, but to a lesser extent to define a smaller overall thickness. The reduced-thickness core portions 30A of FIG. 4 can also be formed to include a higher profile array density (i.e., a higher number of individual profile shapes per unit area). As shown, each panel edge portion 115A, 116A can be approximately half (e.g., 40 to 60 percent) the thickness of the overall panel (T1+2T), and the thickness T2 of each core portion 30A can be approximately half the maximum core thickness T1. The individual thicknesses of the two core portions 30A do not need to be equal, although the sum should be equal to the overall thickness T1, or just less to account for the interstitial skins. The result of this particular flange structure is that the edge portions 115A, 116A only overlap with each other and neither one extends to overlap with the main portion of the adjoining panel 115, 116. It also results in the edge portions 115A, 116A being formed with a high percentage of void space, whereas the edge portions 15A, 16A of FIG. 3 are illustrated as being formed of solid material throughout.

The interior and exterior skins 32, 34 are bent to enclose the co-facing edges of each panel 115, 116. In addition to the Z-shaped bend profiles (i.e., double 90-degree bends, or bends forming interior angles greater than 90 degrees) of the exterior skin 34 of the first panel 115 and the interior skin 32 of the second panel 116, an additional bend is provided in each of the interior skin 32 of the first panel 115 and the exterior skin 34 of the second panel 116. The joining of the panels 115, 116 can be via one or more rows of mechanical fasteners (e.g., screws, rivets), welding, adhesive bonding, or a combination of methods. An alternative to the illustrated single row of rivets 38 is to allow one or both of the skins 32, 34 to continue and overlap the adjoining panel either on its surface as shown in FIG. 3 or by recess configuration as mentioned above. This additional overlap can provide another area for receiving one or more additional rows of mechanical fasteners, or other fastening means. In such cases, the core 30 can be provided with a further-reduced thickness as compared to the thickness T2 of the core portions 30A. For example, the core 30 may include a flat edge portion extending within the additional flange. It should also be noted that the rivets 38 may be installed from the opposite side, in mirrored orientation from that shown.

Figure 5:
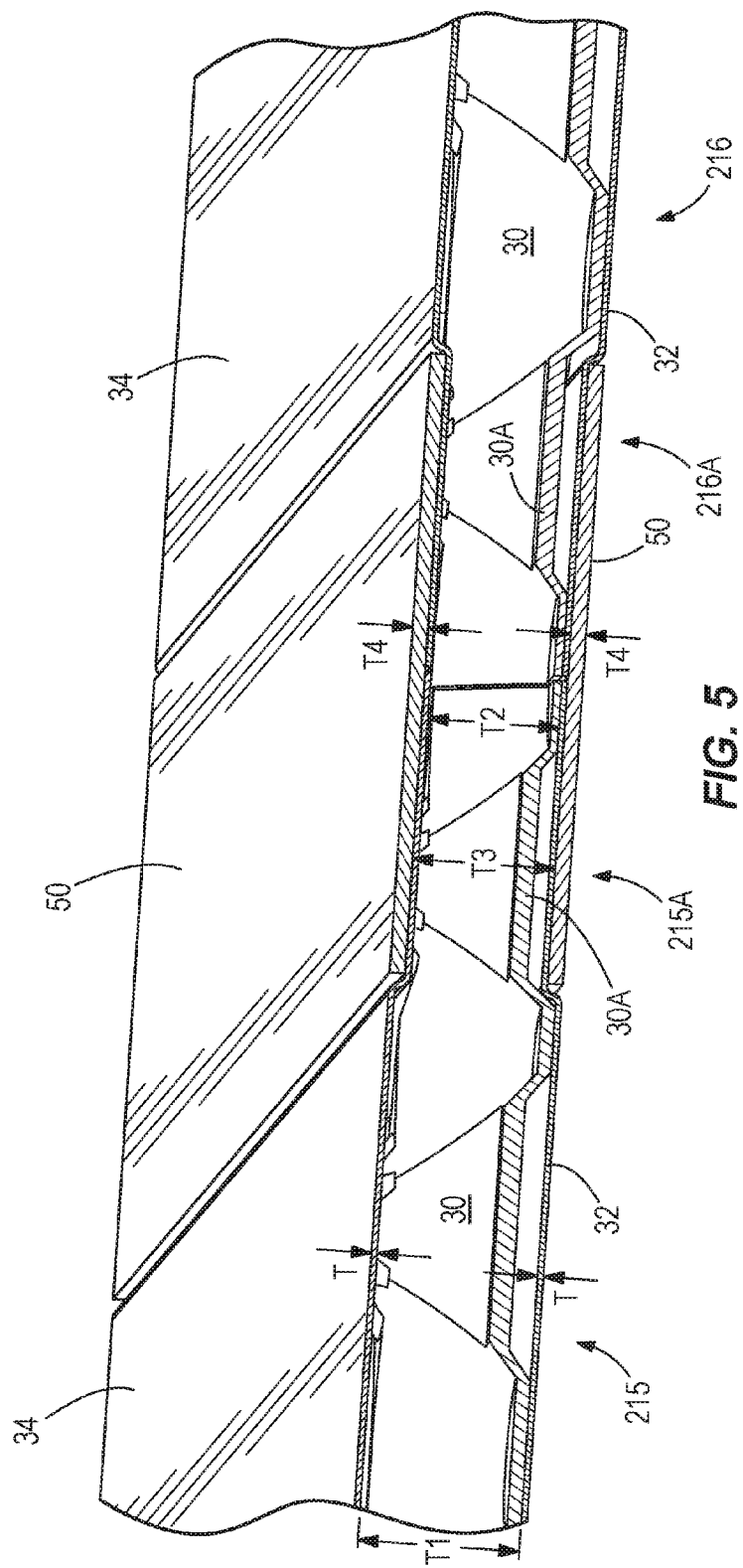
FIG. 5 is a cross-sectional view of a sidewall joint of the trailer shown in FIGS. 1 and 2, according to a third embodiment.

A panel edge treatment and a corresponding joint construction according to a third embodiment are shown in FIG. 5. Although not a shiplap joint, many individual features of the panels 215, 216 are generally similar to that shown and described above in reference to FIGS. 3 and 4, and the above description is relied upon for disclosing the details of such features. The description below focuses on the details of FIG. 5 that differ from the above-described embodiments. In the construction of FIG. 5, the two panels 215, 216 have co-facing edges that are abutting or nearly abutted, but the panels 215, 216 themselves do not overlap one another. Rather, splice plates 50 are provided to join the first and second panels 215, 216. Each splice plate 50 can be adhesively bonded with both panels 215, 216 within corresponding edge portions 215A, 216A as shown. The joining of the juncture between each splice plate 50 and the corresponding panels 215, 216 can alternately be via a row of mechanical fasteners (e.g., screws, rivets, etc.), welding, or a combination of methods. FIG. 5 shows the interior and exterior splice plates 50 recessed to a flush condition with the interior surfaces of the interior skins 32 and the exterior surfaces of the exterior skins 34, respectively. This is accomplished by providing each panel 215, 216 with a corresponding edge portion 215A, 216A of reduced thickness. As illustrated, this is achieved by providing a reduced-thickness core portion 30A, which is reduced by a thickness equal to or approximately equal to a thickness T4 of the splicer plate 50 on both sides of the core 30. As such, the reduced-thickness core portions 30A within the edge portions 215A, 216A are reduced by an amount that offsets the presence of the splicer plates 50. However, contrary to the above-described embodiments, the reduced-thickness core portions 30A can have a thickness T2 that is greater than half the maximum core thickness T1, and may be more than 80 percent of the maximum core thickness T1. Likewise, the total thickness T3 of each edge portion 215A, 216A can be greater than half the maximum panel thickness (T1+2T) throughout the main portion of the panel 215, 216, and may be more than 80 percent thereof. Although not illustrated, the option to separate the respective panel cores 30 and close off the co-facing edge conditions of each panel 215, 216 by forming a single 90 degree bend of one or both skins 32, 34 of the panels 215, 216 is also contemplated.

Figure 6:
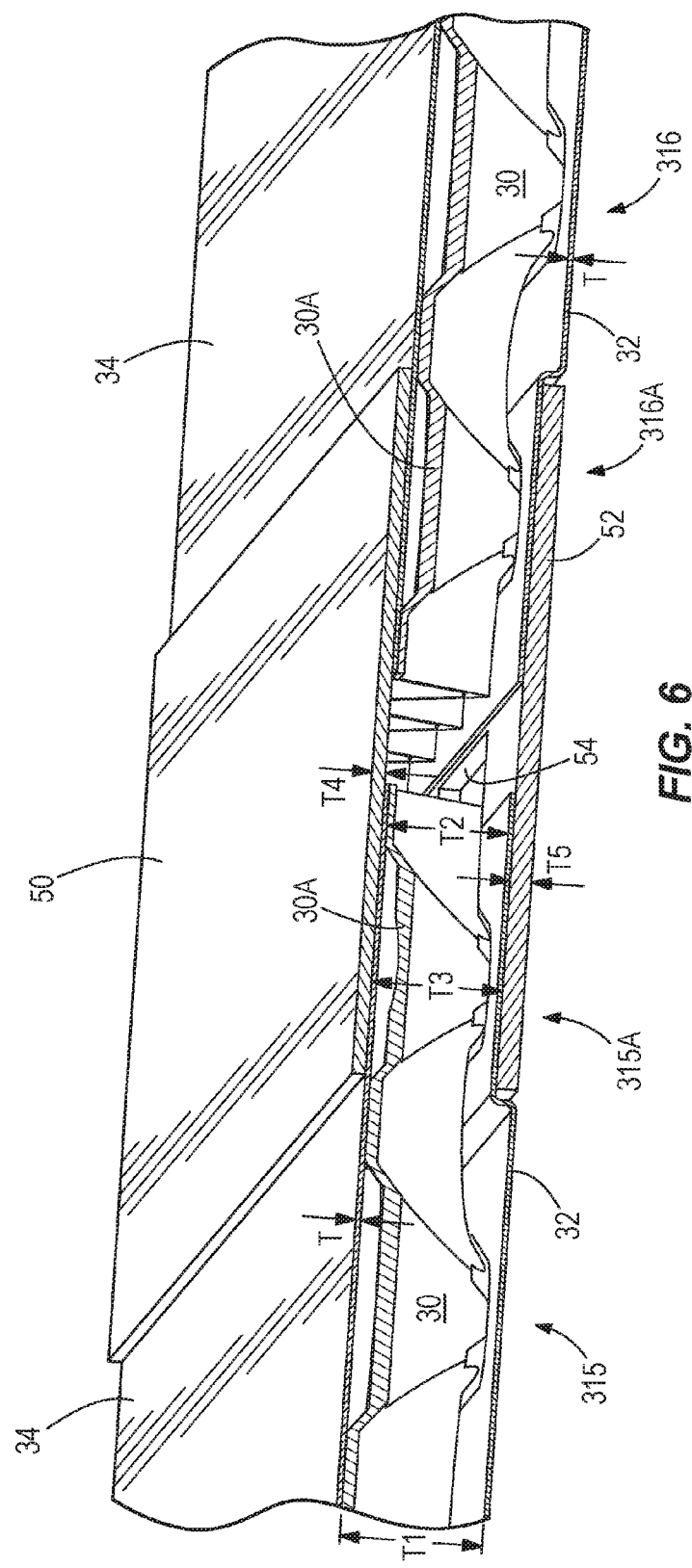
FIG. 6 is a cross-sectional view of a sidewall joint of the trailer shown in FIGS. 1 and 2, according to a fourth embodiment.

A panel edge treatment and a corresponding joint construction according to a fourth embodiment are shown in FIG. 6. Many individual features of the panels 315, 316 are generally similar to that shown and described above in reference to the above-described constructions, particularly that of FIG. 5, and the above description is relied upon for disclosing the details of such features. The description below focuses on the details of FIG. 6 that differ from the above-described embodiments. In the construction of FIG. 6, exterior and interior splice plates 50, 52 are used to join the panels 315, 316 at their respective edge portions 315A, 316A by adhesive bonding between the splice plates 50, 52 and the panels 315A, 316A. However, the two splice plates 50, 52 may have differing material thicknesses T4, T5 as opposed to equal material thicknesses as shown in FIG. 5. As shown, the thickness T5 of the interior splice plate 52 is greater than the thickness T4 of the exterior splice plate 50 (e.g., T4 is ½ to ¾ of T5), although this may be reversed in alternate constructions. In both FIG. 5 and FIG. 6, the two splice plates 50, 52 can be constructed of the same or different type of raw material. Also, the interior splice plate 52 is thicker than the interior and exterior splice plates 50 of FIG. 5, and FIG. 6 illustrates a deeper recess in the edge portions 315A, 316A of the panels 315, 316 as defined by the exterior skins 34. No recess is provided within the edge portions 315A, 316A on the exterior side, and the exterior skins 34 of both panels 315, 316 are flat to their distal edges such that the exterior splice plate 50 sits raised from the exterior skins 34. However, the thickness T4 of the exterior splice plate 50 may be 0.375 inch or less to maintain a smooth interior surface of the trailer 10. In some constructions the thickness T4 of the exterior splice plate 50 may be between 0.050 inch and 0.080 inch. Because the edge portions 315A, 316A are only recessed on one side, but recessed to a greater extent than either recess of the construction of FIG. 5, the thickness T2 of the reduced-thickness core portions 30A, and the overall edge portion thickness T3 can be similar to those of FIG. 5.

The joint of FIG. 6 is constructed with a space provided between the co-facing distal edges of the adjacent panels 315, 316. This may provide additional functionality to the joint. At least one of the splice plates (interior splice plate 52 as shown) is provided with an aperture 54 to allow engagement of a fitting for tie-off or other restraint provision (such as for stacking or blocking of the structure). The aperture 54 is provided in communication with an interior of the joint and in communication with the gap between the distal edges of the two panels 315, 316. Closing off the edge condition of one or both panels 315, 316 (e.g., by forming a single 90-degree bend of either or both skins 32, 34) is again optional. Also, the fastening of the joint can be via two or more rows of mechanical fasteners (e.g., screws, rivets, etc.), welding, adhesive bonding, or a combination of methods.

Figure 7:
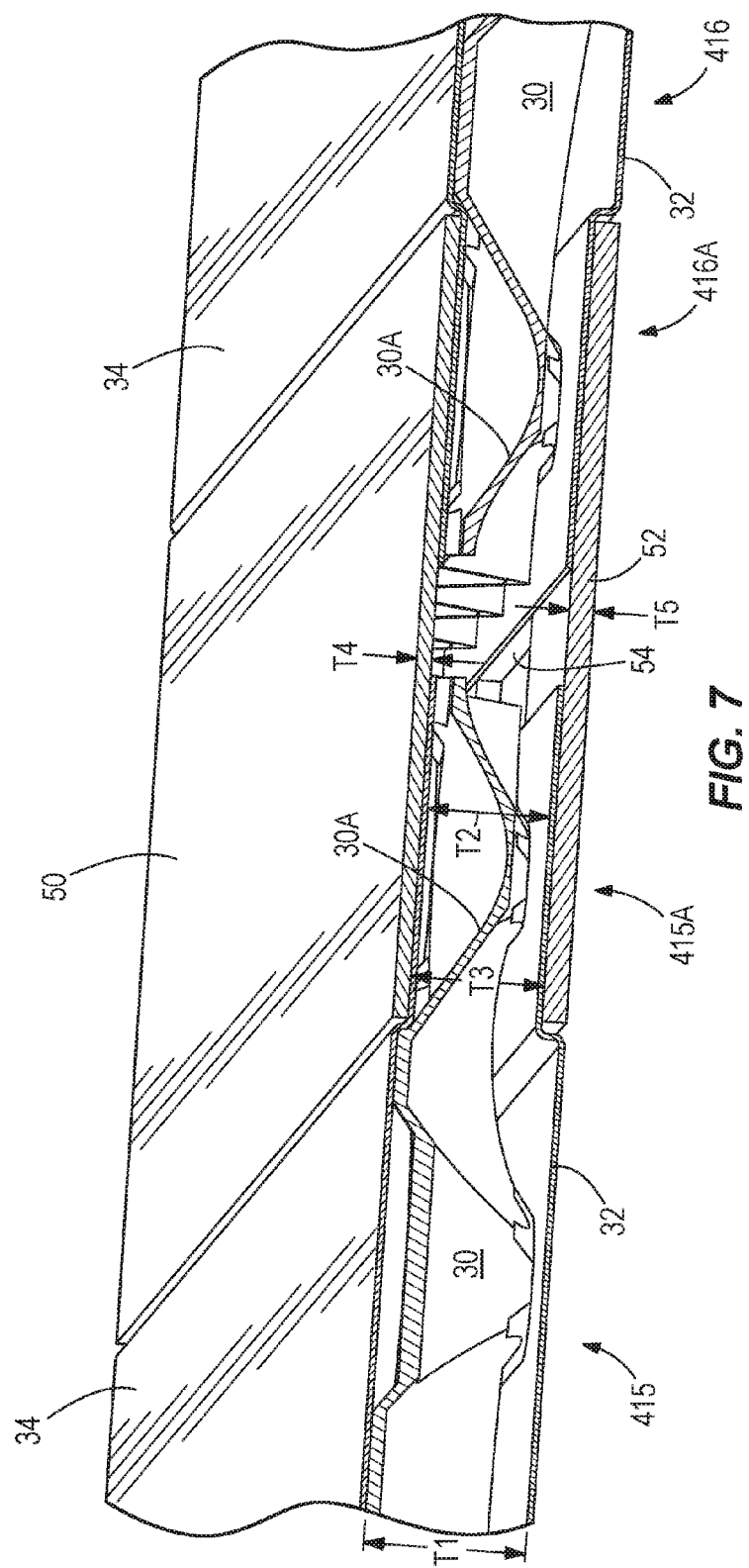
FIG. 7 is a cross-sectional view of a sidewall joint of the trailer shown in FIGS. 1 and 2, according to a fifth embodiment.

A panel edge treatment and a corresponding joint construction according to a fifth embodiment are shown in FIG. 7, and is similar to FIG. 6, except that the edge portions 415A, 416A are further recessed on the interior side such that the interior splice plate 50 is recessed flush with the interior surfaces of the interior skins 32. As such, the core portions 30A within the edge portions 415A, 416A are reduced to a thickness T2 below that of FIG. 6, and the overall edge portion thicknesses T3 are likewise reduced with respect to FIG. 6.

A panel edge treatment and a corresponding joint construction according to a sixth embodiment are shown in FIG.

8. The edge condition shown in FIG. 8 allows for an inclusion of a profile insert 70 inserted into the assembly of the joint. The profile insert 70 can be a track of a cargo control or shoring system, or auxiliary decking system. For example, the profile insert 70 can be a track defining one or more longitudinal channels C that adjustably receives one or more logistic bars for restraining cargo and/or auxiliary deck beams used for creating a load deck spaced above the trailer floor 14. The profile insert 70 and channel(s) C therein typically are arranged with an elongated longitudinal direction extending in the direction of the trailer height H, but may also extend in other directions such as the direction of the trailer length L.

Figure 8:
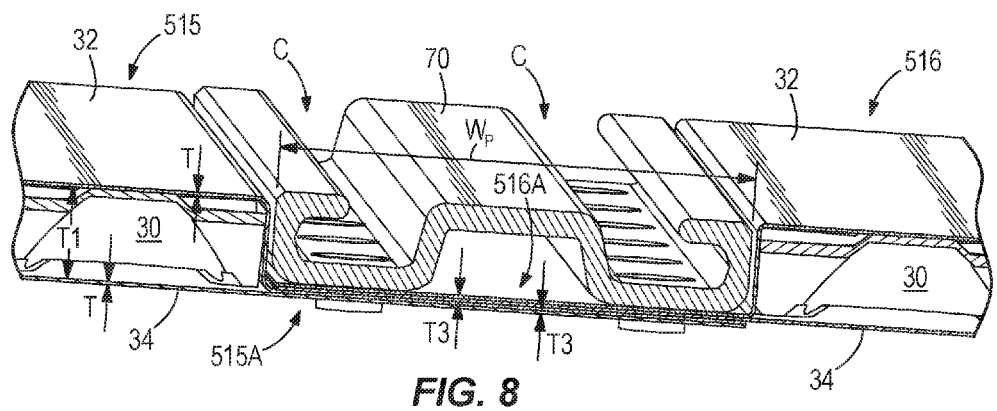
FIG. 8 is a cross-sectional view of a sidewall joint of the trailer shown in FIGS. 1 and 2, according to a sixth embodiment. The joint forms a recess to accommodate an integral profiled component.

In the illustrated joint construction, each of the two adjoining panels 515, 516 has both their skins 32, 34 formed to one common (exterior) side of the panel thickness to form a flange or edge portion 515A, 516A. This may be accomplished by forming the opposite (interior) skins 32 to a shape to allow both skins 32, 34 to be brought to a common surface for bonding. The two adjoining edge portions 515A, 516A can be entirely overlapped with each other as shown, and each edge portion 515A, 516A can extend from the main portion of the respective panel 515, 516 to define a width (in the left-right direction as shown in FIG. 8) that is approximately equal to a width of the profile insert 70, for example within 10 percent of the profile insert width $W_P$. Thus, all four skins 32, 34 (or any fraction thereof) can extend across the entire joint, underneath the profile insert 70. In other constructions, the two edge portions 515A, 516A may be only partially overlapped, or not overlapped. The edge portions 515A, 516A and the joint formed therewith define a pocket or recess for receiving the profile insert 70, which is integrally joined as part of the joint between the panels 515, 516. The profile insert 70 may be received by the pocket so as to be flush with the interior surfaces of the interior skins 32 as shown, or may protrude slightly from the pocket or be recessed slightly in the pocket in the panel thickness direction.

Each panel core 30 may terminate at the respective side of the profile insert 70 as shown so as to not extend into the edge portions 515A, 516A, or may be provided with a reduced thickness (e.g., a flat section of the core along the common plane) thereby creating a 3-layer material thickness for the edge portion 515A, 516A of each panel (or any combination of the above described). In FIG. 8, the joint can be made wide enough to allow for multiple rows of fasteners to provide for the connection. The fastening of the joint can be via one or more rows of mechanical fasteners (e.g., screws, rivets, etc.), welding, adhesive bonding, or a combination of methods.

Figure 9:
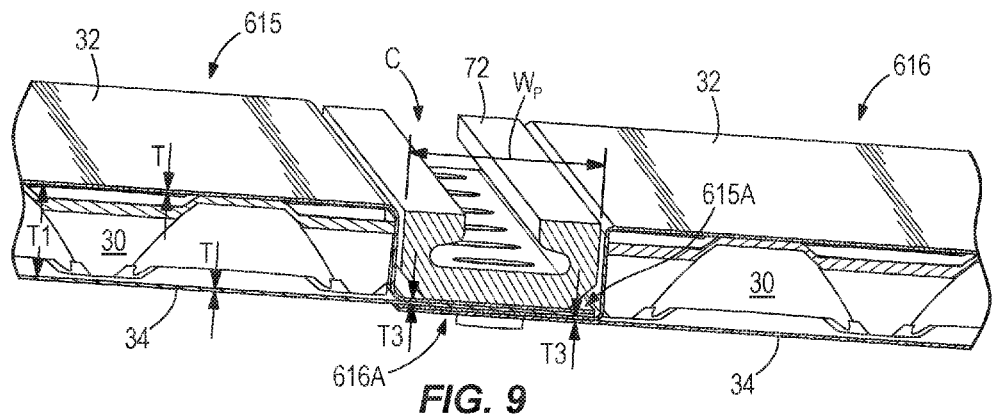
FIG. 9 is a cross-sectional view of a sidewall joint of the trailer shown in FIGS. 1 and 2, according to a seventh embodiment. The joint forms a recess to accommodate an integral profiled component.

A panel edge treatment and a corresponding joint construction according to a seventh embodiment are shown in FIG. 9. This construction is similar to the joint shown in FIG. 8, except as described below. Although the skins 32, 34 are formed as described above to create flange or edge portions 615A, 616A defining a pocket for a profile insert 72, the edge portions 615A, 616A of FIG. 9 are narrower in a direction extending away from the main panel portions toward the adjoining panel. The narrower construction accommodates or conforms to a narrower profile insert 72, in this case having a single channel C. The integral profile insert 72 of FIG. 9 can have a width $W_P$ that is less than twice the panel thickness (T1+2T), whereas the width $W_P$ of the profile insert 70 of FIG. 8 can be more than two times or even more than three times the panel thickness. The joint, including the profile insert 72 of FIG. 9, may be fastened with a single row of mechanical fasteners, although any of the fastening options described above may also be used in lieu of or in combination with a single row of mechanical fasteners.

Figure 10:
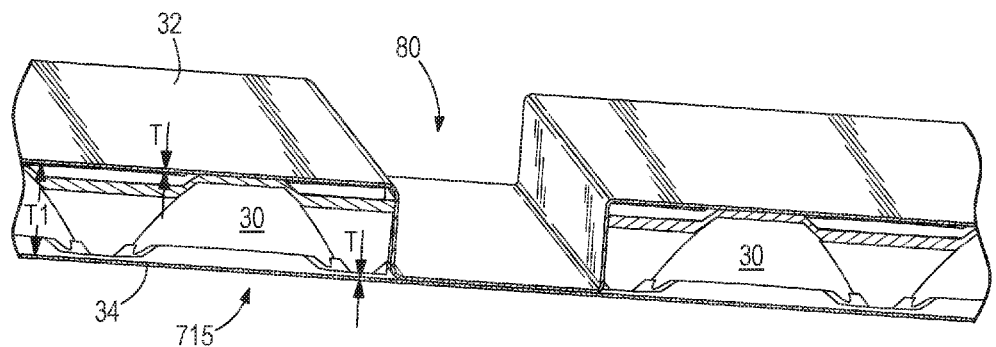
FIG. 10 is a cross-sectional view of a single sidewall panel including a recess formed to receive a profiled component that does not extend along an edge portion to form a joint.

FIG. 10 illustrates a portion of a single composite panel 715, rather than a joint between panels. It will be understood that the panel 715 may have any one of the illustrated edge treatments described above, or alternatives thereof, and the above description is referred to for numerous details of the panel 715 and its components in order to avoid redundancy. The panel 715 provides a pocket or recess 80 for insertion of one or more profile inserts (not shown) at any predetermined location in the panel 715. The recess 80 can be located centrally within the panel 715, or any other position across the panel 715, and can be elongated to extend along the panel 715 in a direction of the trailer height H (e.g., along the entire panel height, or a portion thereof). In some constructions, one or more recesses may extend across the width of the panel 715 (e.g., in a direction of the trailer length L). It is also contemplated to place multiple recesses across the width of the panel (i.e. running edge to edge) based upon radial placement of flattening bars. The core 30 may be provided in separate sections on opposing sides of the recess 80 or a reduced (e.g., flat) core section may be provided directly under the recess 80, continuous or discontinuous with one or both of the core sections flanking the recess 80. The recess(es) 80 can be utilized to accommodate structures (e.g., brackets, electrical wiring, piping, etc.) which may otherwise require an irregular inner or outer shaping of the trailer 10. As such, the inclusion of the recess 80 enables a wind drag reduction for better fuel efficiency when transporting the trailer 10 and/or a smoother interior wall surface to reduce cargo hang-up or snagging during loading and unloading.

Figure 11:
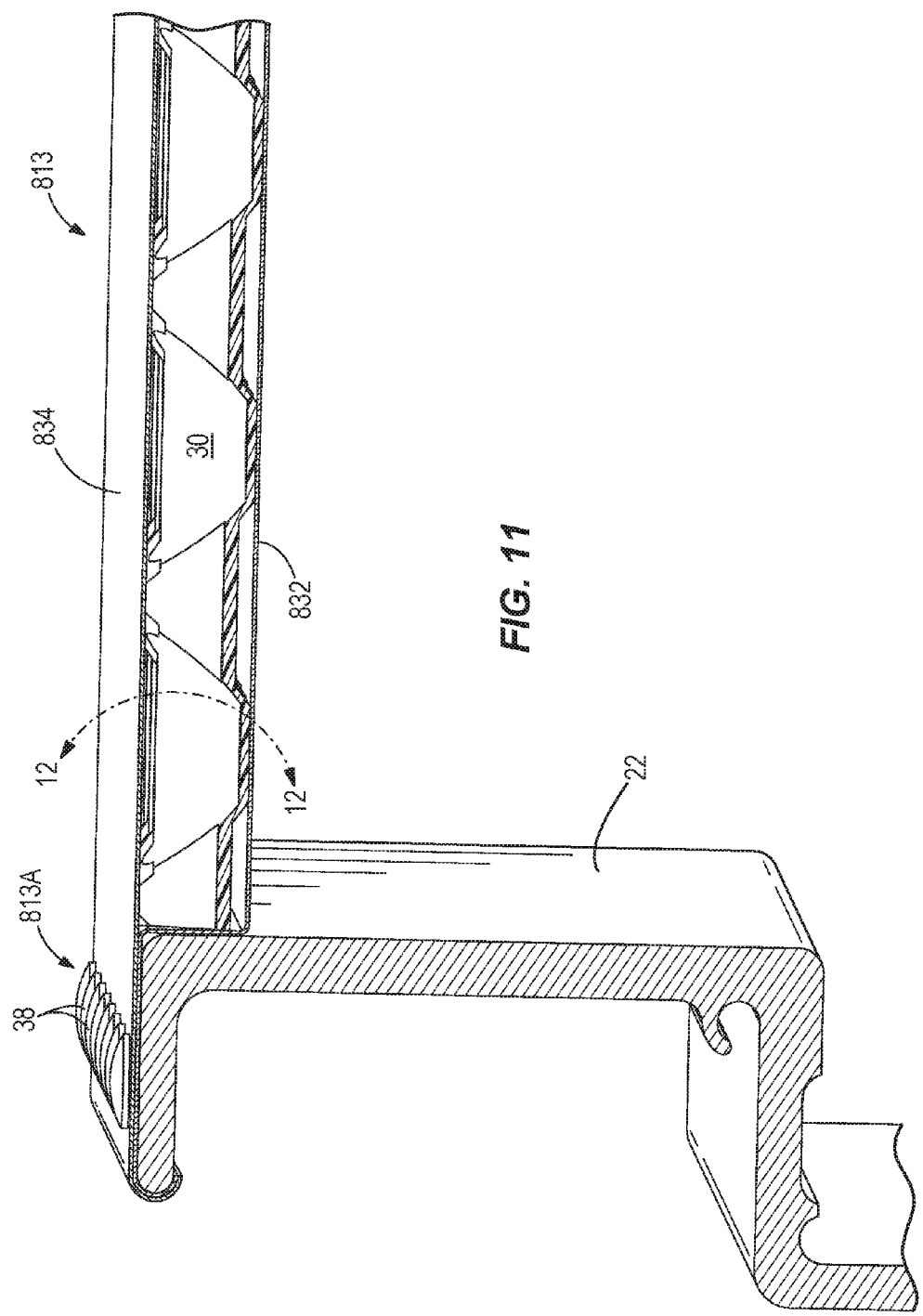
FIG. 11 is a cross-sectional view of a composite roof panel and an upper rail of the trailer of FIG. 1, and a joint therebetween.
Figure 12:
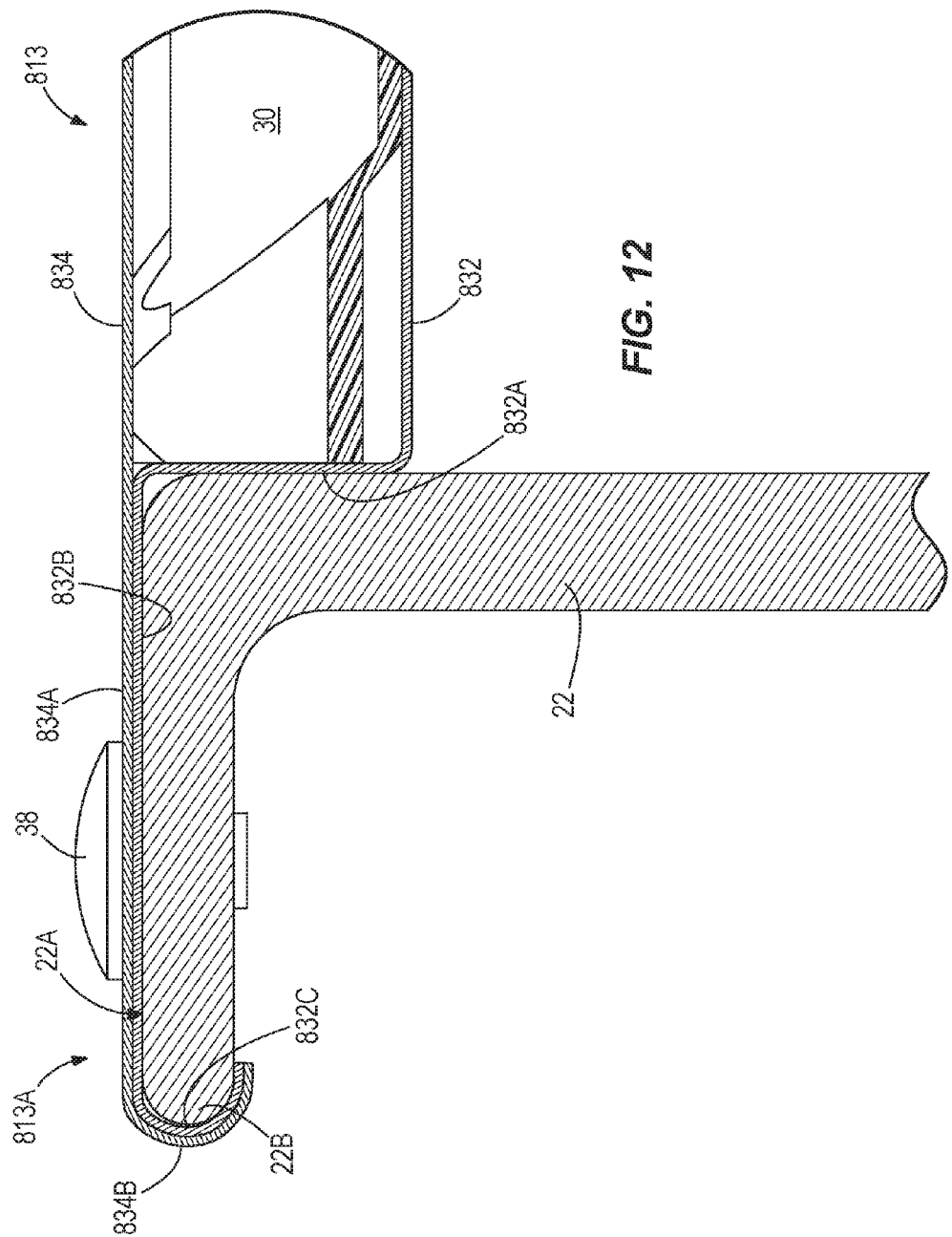
FIG. 12 is a detail view of a portion of the roof joint of FIG. 11.

An additional trailer joint having similarities to the above described joint constructions is shown in FIGS. 11-12. Rather than a sidewall joint, the joint is formed between a roof panel 813 and the trailer upper rail 22. Although not shown, the roof 13 may consist of a plurality of the roof panels 813 joined together by any one of the joint types set forth herein, among others. The roof panel 813 can have a core 30 similar to any of the above-described constructions, and can be sandwiched between an inner skin 832 and an outer skin 834. In some constructions, the core 30, and the panel 813 as a whole spans the full width W of the trailer 10 such that the panel 813 is formed with two opposing edge portions 813A (one shown) configured to engage the opposing lengthwise upper rails 22 of the trailer 10. In other constructions, at least one joint is made with another panel across the width direction of the roof 13.

The edge portion 813 can be a flat flange formed by one or both of the skins 832, 834. As illustrated, the interior skin 832 wraps 90-degrees around an edge of the core 30 toward the exterior skin 834 (i.e., skin portion 832A) before wrapping 90-degrees again to run directly under the exterior skin 834, alongside a top surface 22A of the upper rail 22 (i.e., skin portion 832B). Although shown with bends forming 90-degree angles, it is also contemplated that the interior skin 832 can be bent to form angles greater than 90 degrees. The exterior skin 834 can extend along a consistent planar direction in the main panel portion having the core 30 and also the edge portion 813A extending along the upper rail 22 (i.e., skin portion 834A). The skins 832, 834 defining the edge portion 813A can be secured to the upper rail 22 with one or more rows of mechanical fasteners 38 (e.g., screws, rivets, etc.), welding, adhesive bonding, or a combination of methods. As illustrated, the edge portion 813A can further be formed with a lip that wraps around a laterally-distal edge 22B of the upper rail 22. The lip can include (e.g., 180-degree) rolled edge portions 832C, 834B of both the interior and exterior skins 832, 834. Alternatively, the edge may be left flat (i.e., the rolled edge portions 832C, 834B eliminated) and a profiled edge cap added as the fastening and sealing component. The edge cap (not shown) can have a shape similar to the portions 834A, 834B.

Figure 13:
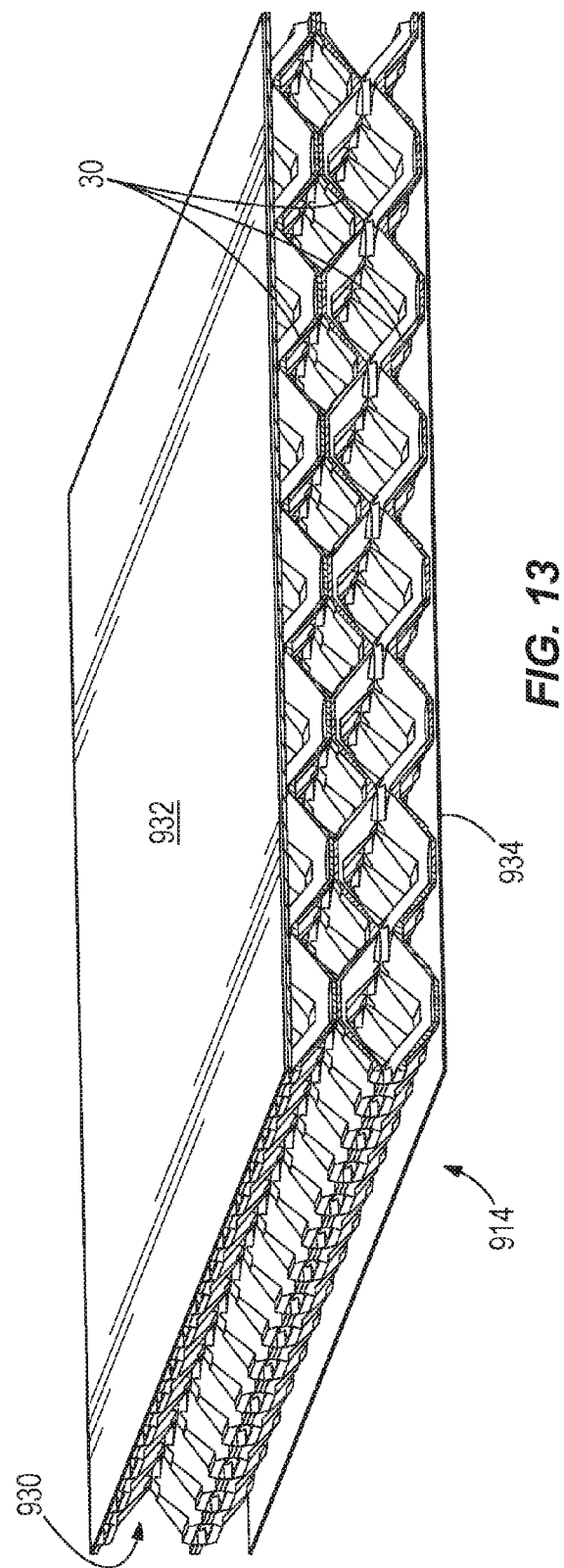
FIG. 13 is a cross-sectional view of a composite floor platen of a floor of the trailer of FIGS. 1 and 2.

As illustrated in FIG. 13, a multi-layer floor platen 914 may be constructed utilizing similar materials and construction techniques as those described above. The floor platen 914 can include an interior skin 932 and an exterior skin 934, between which a core 930 is sandwiched. The core 930 can include multiple profiled core sheets 30, each having a shape and material construction as described above. In fact, the core sheets 30 of the floor platen 914 can have an identical cross-sectional profile to cores 30 used in the sidewalls 12 and/or roof 13 of the trailer 10. In some constructions, each core sheet 30 has a thickness T1 of 0.75 inch, and the total thickness of the core 930 is 2.25 inches. Each core sheet 30 can include an array of interspersed peaks and valleys, with the adjacent core sheets 30 stacked to establish only facing peak-to-peak contact rather than nested peak-into-valley contact. As such, void space and overall thickness are maximized for the multi-layer core 930. As an alternative, a single profiled core sheet may be used to construct the floor platen 914. Such a core sheet may be profiled with peaks and valleys to define an overall core thickness of over 1.0 inch (e.g., 1.5 inches or more) in some constructions. Although not shown, additional interstitial skins can also be provided between adjacent overlying core sheets 30 within the floor platen 914. The structure may be provided as the substructure of the trailer floor 14. For additional strength, more or taller core sheets 30 may be added. Use of the floor plate 914 may allow for elimination of cross-member type construction, resulting in a reduction in aerodynamic drag.

Figure 14:
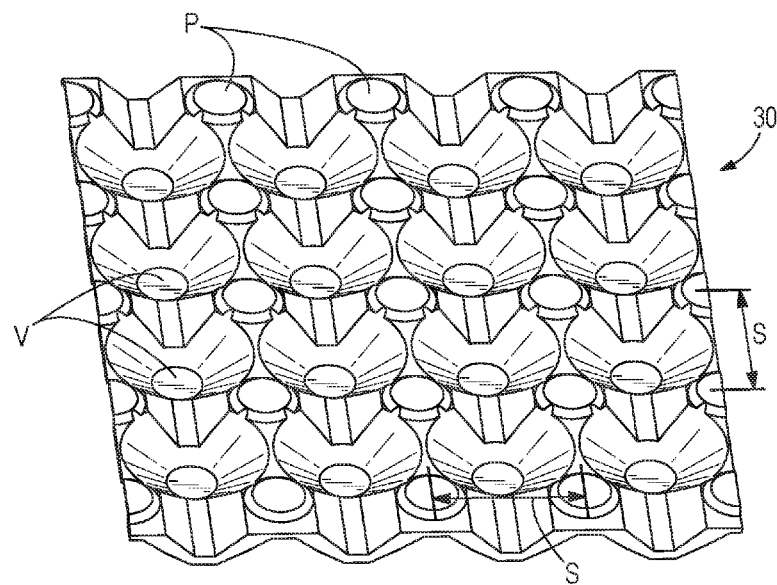
FIG. 14 is a first perspective view of one exemplary profiled core sheet for use in panels throughout the trailer of FIGS. 1 and 2.
Figure 15:
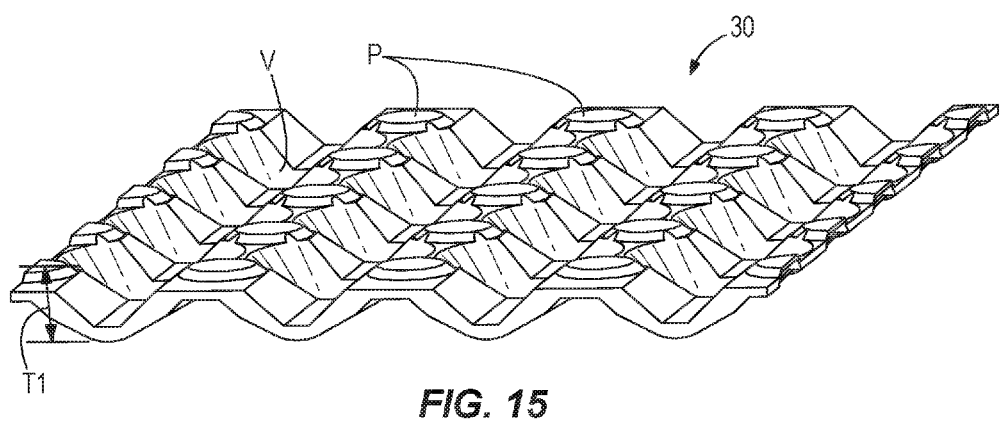
FIG. 15 is a second perspective view of the profiled core sheet of FIG. 14.

FIGS. 14 and 15 illustrate an example of a core sheet 30 used in constructing the floor platen 914 or any of the above-described panels. As previously mentioned, the core sheet 30 can be draw formed from a flat metal sheet to form an array of spaced apart peaks P and valleys V, at regular or irregular intervals. The sheet can be embossed (i.e., pressed by an embossing roll or drum to create reliefs in one direction) or dual embossed (i.e., drawn in two opposing directions). Dual-embossing may include forming with two embossing drums with interleaving projections or studs so that reliefs are drawn into the material in two opposite directions from the beginning plane of the material. It may be desirable to minimize the amount of material and to maximize the amount of vacant space (within strength constraints of the material) in order to reduce the overall weight of the core sheet and the panel. Each peak P can be formed by a raised area or "button" defining a contact point for contacting an adjacent skin sheet. The peaks P of one surface of the core sheet 30 define the locations of the valleys V of the opposite surface of an adjacent core sheet 30, and vice versa. Although dimensions may vary based on selected material, load ratings, etc., the core sheet 30 in one construction defines a peak-to-peak spacing S of 0.750 inch in both coordinate directions and a thickness T1 of 0.500 inch. The starting sheet may be not less than 0.008 inch and not more than 0.016 inch thick in some constructions, and more particularly, may be about 0.011 inch (0.010 inch to 0.012 inch), and the material may be galvanized steel, or aluminum, although these parameters may vary by application. The peaks P and the valleys V may be provided in varying densities (i.e., number per area) across a given core sheet 30. In some constructions, the density of peaks P and valleys V is increased at edge portions of the core sheets 30, particularly in edge portions having a reduced thickness, examples of which are described above.

Figure 18:
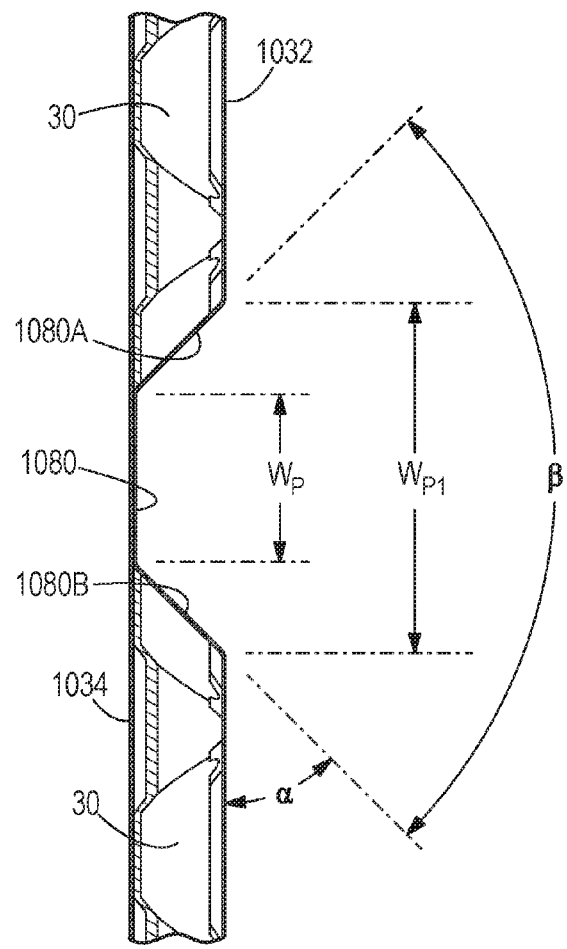
FIG. 18 is a detail view of FIG. 17, illustrating the mid-panel recess in further detail.
Figure 19:
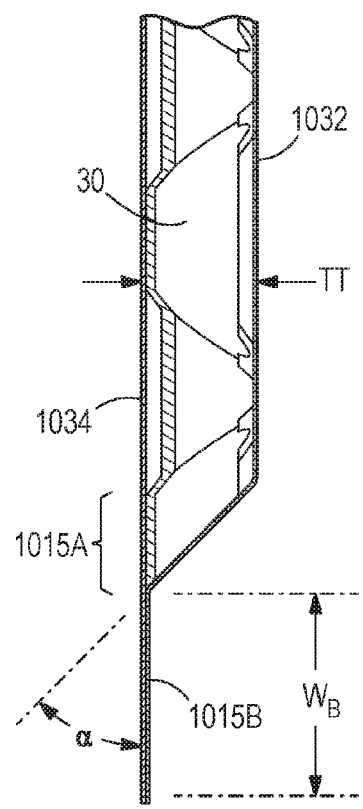
FIG. 19 is a detail view of FIG. 17, illustrating one of the distal edges of the panel in further detail.
Figure 20:
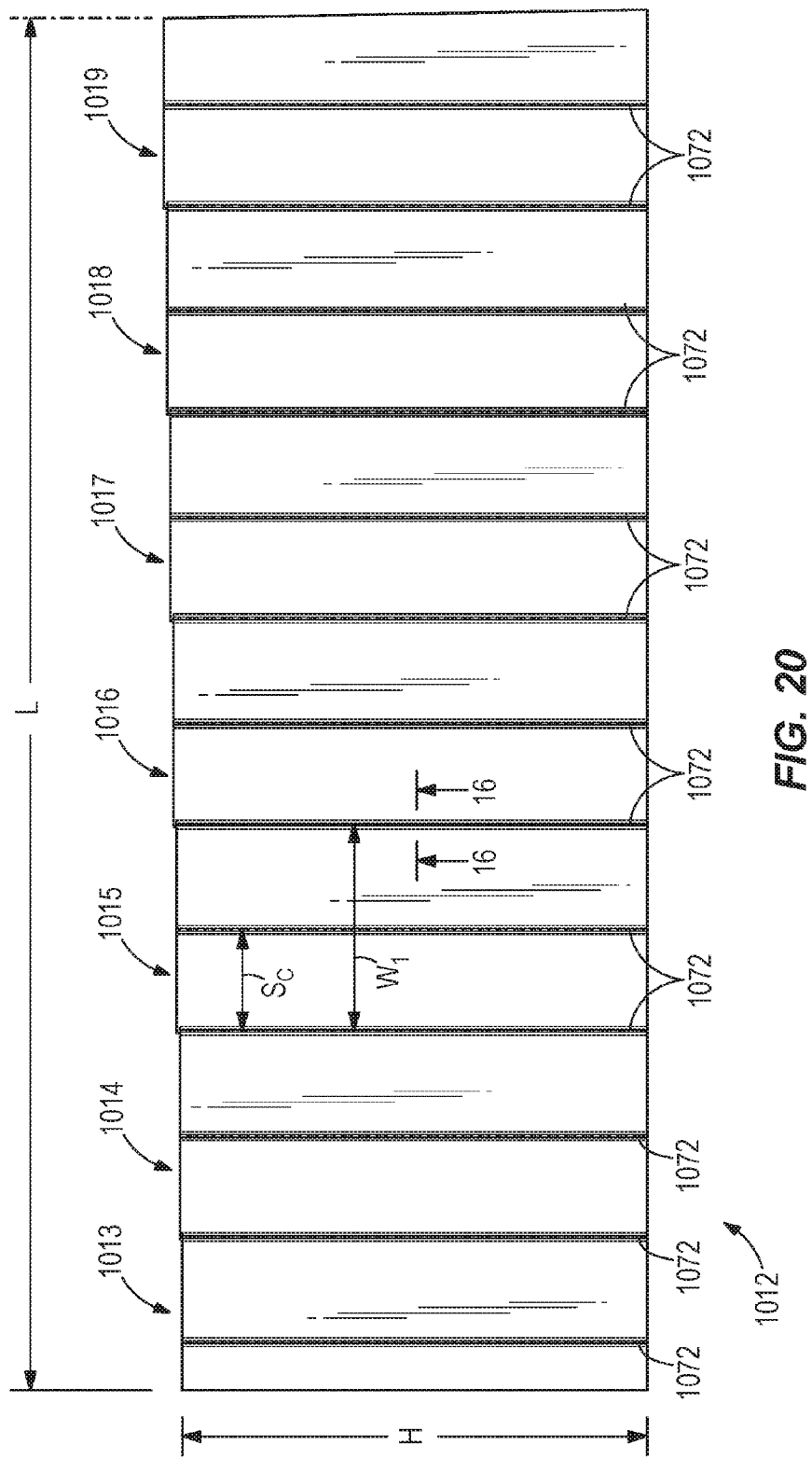
FIG. 20 illustrates a trailer sidewall for a wedge-type construction, utilizing the joint construction of FIGS. 16-19.

FIGS. 16-20 illustrate panels and a corresponding joint construction according to another embodiment. The embodiment of FIGS. 16-20 incorporates features similar to some of the above-described embodiments, including those of FIGS. 8-10. In addition, basic elements, such as the interior and exterior skins 1032, 1034, and the cores 30 can conform to the above description, which is referred to for numerous details of the panels 1015, 1016 and their components in order to avoid redundancy. It is also noted that FIG. 20 illustrates a complete sidewall 1012 for a trailer, which may be similar to the trailer 10 of FIGS. 1 and 2 as described above. As shown, the sidewall 1012 includes a series of panels 1013-1019, each sequentially joined to one another. The sidewall 1012 may have a "wedge" construction, in which the panels 1013-1019 increase in height toward a rear end of the sidewall 1012 (i.e., allowing a door opening generally equal to the trailer's interior height at the forward end, despite intrusive structure related to a roll-up door provided at the rear of the trailer). In constructing a trailer with the wedge sidewall 1012, the top edge of the trailer can be generally parallel to ground, while the floor slopes down toward the ground in the rearward direction. In some embodiments by way of example, the height H may increase about 4 inches from the leading or forward end to the rearward end.

Figure 16:
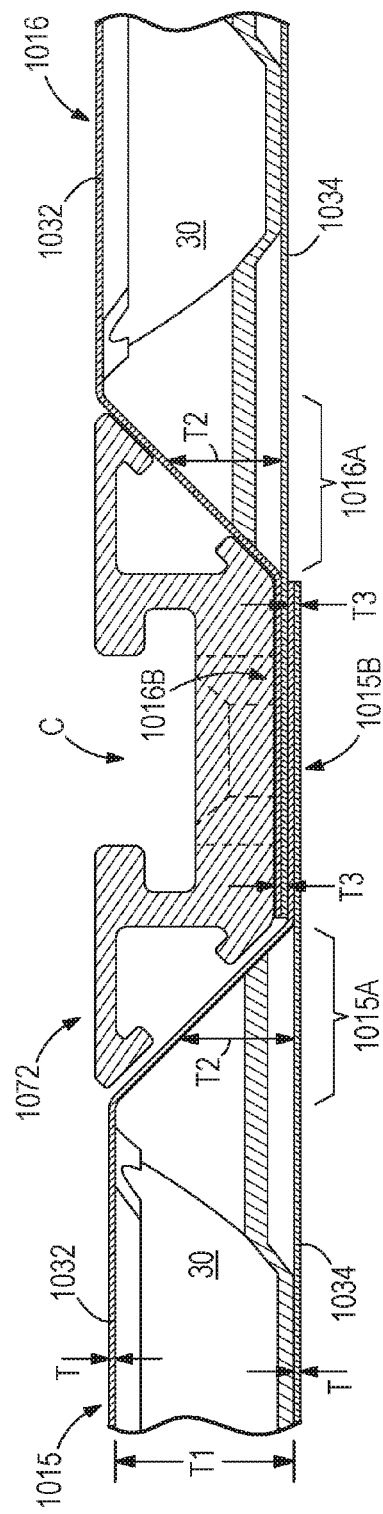
FIG. 16 is a cross-sectional view of a trailer sidewall joint according to yet another embodiment. The joint forms a recess with tapered sides to accommodate an integral profiled component.
Figure 17:
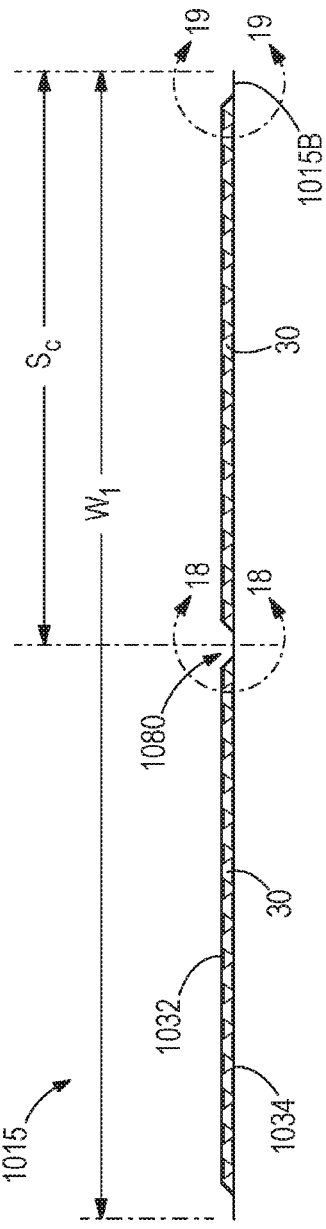
FIG. 17 is an end view of one of the sidewall panels of FIG. 16.

As mentioned above, the panels 1013-1019 of FIGS. 16-20 incorporate features similar to FIGS. 8-10. In particular, each of the panels 1013-1019 includes a mid-panel recess 1080 to accommodate a profile insert 1072 as in FIG. 10, and further includes edge treatments configured to be joined with adjacent panel(s) in a manner that also integrates additional profile inserts 1072 as in FIGS. 8 and 9. The mid-panel recess 1080 can be centrally located along each panel width (i.e., in the direction of sidewall/trailer length L) or located off-center, but spaced from the parallel extending edges. Contrary to the embodiments of FIGS. 8 and 9, the adjoining panels (1015, 1016 shown as exemplary in FIG. 16) form a recess that is not box-like or rectangular having walls angled at 90 degrees, but rather, form a recess that is generally tapered or trapezoidal, being wider at the side of the interior skin 1032. The profile insert 1072 can have a complementary trapezoidal cross-section as shown in FIG. 16. The recess 1080 is defined by a bottom wall generally in-plane with the exterior skins 1034 and two opposing side walls 1080A, 1080B. Each side wall 1080A, 1080B is oriented such that an imaginary line extended to the interior side forms an acute angle $\alpha$ with the interior skin 1032 in the main portion of the panel having the full core thickness T1. As illustrated, the angle $\alpha$ can be 45 degrees, such that the total inclusive angle $\beta$ of the recess 1080 formed by the two side walls 1080A, 1080B is 90 degrees as shown in FIG. 18. However, the angle $\alpha$ may be between 30 degrees and 60 degrees in other constructions, or any other acute angle in other constructions. The bottom wall of the recess 1080 can be formed by directly overlying portions of the interior and exterior skins 1032, 1034 having no core therebetween, although other constructions may utilize a reduced core thickness in this area. As shown in FIG. 18, the thickness of the core 30 reduces (e.g., linearly) in a direction toward the recess 1080 in a manner similar to the shape of the core 30 at each distal panel edge as described below. The width $W_P$ at the bottom wall of the recess 1080 can be 1 inch in some constructions, and the width $W_{P1}$ of the recess 1080 at the wider end, in-plane with the interior skin 1032, can be 2 inches.

As shown in FIG. 16, two panels 1015, 1016 are joined to form a recess configured to accommodate a profile insert 1072 like that incorporated mid-panel. However, rather than being formed solely by shaping of one interior skin 1032, the recess at each joint is formed by overlapping edge portions 1015B, 1016B of both adjoining panels 1015, 1016 and the adjacent co-facing edge portions (which mimic the shape of the side walls 1080A, 1080B of the mid-panel recess 1080). Each panel 1015, 1016 includes a core 30 having a maximum core thickness T1. The core 30 has a gradually reducing thickness T2 in a first edge portion 1015A, 1016A which then transitions to a second edge portion 1015B, 1016B having no core, and consisting only of the overlying interior and exterior skins 1032, 1034. Each of the second edge portions 1015B, 1016B defines a flange having a thickness $T_3$. The thickness $T_3$ can be less than 20 percent of the total panel thickness TT (FIG. 19). Each second edge portion 1015B, 1016B forming the flange extends from the cored portion of the panel by a width $W_B$ (FIG. 19), which can be 1 inch in some constructions. The panels 1015, 1016 can be joined together integrally with the profile insert 1072 with a single row of mechanical fasteners, although any of the fastening options mentioned above may also be used in lieu of or in combination with a single row of mechanical fasteners. The total panel thickness TT (equal to $T_1+2T$) can be between 0.500 inch and 0.600 inch in some constructions (e.g., 0.566 inch). It should be noted that this edge and joint construction may also be employed in panels having no mid-panel recesses or mid-panel profile inserts.

All or a majority of the panels 1013-1019 can have a panel width $W_1$ of about 4 feet (i.e., 48 inches+/−2 inches), and profile inserts 1072 may have an on-center spacing $S_C$ of about 2 feet (i.e., 24 inches+/−1 inch) since there are profile inserts 1072 at both the joint locations and the mid-panel locations. In other constructions, all or the majority of the panels 1013-1019 can have a panel width $W_1$ of about 2 feet with no mid-panel profile inserts 1072 such that the on-center spacing $S_C$ is also about 2 feet. In other constructions, the on-center spacing $S_C$ is about 16 inches (i.e., 16 inches+/−1 inch). Finally, it should be noted that specific features, shapes, or configurations of any or all of the above-described embodiments may be mixed and matched together, unless expressly prohibited, to result in additional embodiments not explicitly illustrated or described herein. As one example, any of the earlier-described embodiments having parallel co-facing portions (e.g., formed by a 90-degree bend in a panel skin), at the edges of two adjoining panels and/or on opposing sides of a mid-panel recess, can instead be formed to include non-parallel co-facing portions (e.g., formed by a bend in a panel skin of less than 90 degrees, for example, 30-60 degrees, or particularly 45 degrees).

What is claimed is:

1. A cargo body comprising:
   a floor;
   a roof; and
   a plurality of sidewalls extending between the floor and the roof to define a cargo receiving volume in cooperation with the floor and the roof, each one of the plurality of sidewalls constructed of a plurality of panels including adjacent pairs of panels secured together at respective joints,
   wherein each of the plurality of panels is a composite panel having a core, an interior skin secured to a first side of the core facing the cargo receiving volume, and an exterior skin secured to a second side of the core opposite the first side,
   wherein each of the joints includes an interior splice plate and an exterior splice plate, and co-facing edge portions of the adjacent pair of panels are sandwiched between the interior and exterior splice places,
   wherein each edge portion defines a region of reduced core thickness in which a core thickness measured between the respective interior and exterior skins is less than a maximum core thickness measured between the respective interior and exterior skins, and
   wherein a recess is formed by the pair of interior skins or by the pair of exterior skins to receive the corresponding one of the interior and exterior splice plates, such that the corresponding one of the interior and exterior splice plate is nested into the recess.

2. The cargo body of claim 1, wherein respective facing distal edges of the cores of the adjacent pairs of panels abut each other.

3. The cargo body of claim 1, wherein respective facing distal edges of the cores of the adjacent pairs of panels are spaced apart from each other.

4. The cargo body of claim 3, further comprising at least one aperture formed in one of the interior or exterior splice plates, the at least one aperture being exposed to a space defined between the respective facing distal edges.

5. The cargo body of claim 3, wherein at least one of the facing distal edges of the cores is covered by a 90-degree bent portion of the interior or exterior skin of the respective panel.

6. The cargo body of claim 5, wherein each of the facing distal edges of the cores is covered by a respective 90-degree bent portion of the interior or exterior skin of the respective panel.

7. The cargo body of claim 1, wherein each of the interior and exterior splice plates has a thickness greater than the interior and exterior skins.

8. The cargo body of claim 1, wherein the recess is a first recess formed by the corresponding pair of interior skins, and the interior splice plate is nested into the first recess, and further comprising a second recess formed by the corresponding pair of exterior skins, wherein the exterior splice plate is nested into the second recess.

9. The cargo body of claim 8, wherein an exterior surface of the exterior splice plate is flush with exterior surfaces of the exterior skins of the adjacent pair of panels, and an interior surface of the interior splice plate is flush with interior surfaces of the interior skins of the adjacent pair of panels.

10. The cargo body of claim 1, wherein the at least one nested interior or exterior splice plate is nested into the recess so as to not extend in a panel thickness direction beyond exposed faces of the interior or exterior skins that receive the nested splice plate.

* * * * *

UNITED STATES PATENT AND TRADEMARK OFFICE
CERTIFICATE OF CORRECTION

PATENT NO. : 9,884,661 B2  
APPLICATION NO. : 15/353475  
DATED : February 6, 2018  
INVENTOR(S) : Gary L. Fenton et al.

Page 1 of 1

It is certified that error appears in the above-identified patent and that said Letters Patent is hereby corrected as shown below:

In the Claims

Under Claim 1, Column 14, Line 12: replace "between the interior and exterior splice places," with --between the interior and exterior splice plates,--

Signed and Sealed this
Twenty-first Day of August, 2018

Andrei Iancu
*Director of the United States Patent and Trademark Office*